US009246350B2

(12) United States Patent
Jung et al.

(10) Patent No.: US 9,246,350 B2
(45) Date of Patent: Jan. 26, 2016

(54) METHOD AND APPARATUS FOR WIRELESSLY CHARGING A MOBILE TERMINAL

(75) Inventors: Hee-Won Jung, Suwon-si (KR); Joon-Ho Park, Seongnam-si (KR); Eun-Tae Won, Seoul (KR); Jun-Ho Koh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 397 days.

(21) Appl. No.: 13/634,488

(22) PCT Filed: Mar. 14, 2011

(86) PCT No.: PCT/KR2011/001777
§ 371 (c)(1),
(2), (4) Date: Sep. 12, 2012

(87) PCT Pub. No.: WO2011/112064
PCT Pub. Date: Sep. 15, 2011

(65) Prior Publication Data
US 2013/0002191 A1    Jan. 3, 2013

(30) Foreign Application Priority Data

Mar. 12, 2010    (KR) .................. 10-2010-0022534

(51) Int. Cl.
*H02J 7/00* (2006.01)
*H02J 7/02* (2006.01)
*H02J 17/00* (2006.01)
*H02J 5/00* (2006.01)

(52) U.S. Cl.
CPC ................ *H02J 7/025* (2013.01); *H02J 5/005* (2013.01); *H02J 17/00* (2013.01)

(58) Field of Classification Search
CPC ......... H02J 7/025; H02J 7/0004; H02J 5/005; H02J 7/0052; H02J 7/0042; H02J 17/00; H02J 7/0027; H02J 2007/0098; H02J 7/0047; H02J 2007/0062; H02J 7/00; H02J 7/0055; H02J 7/0044; H02J 2007/0037; H02J 2007/0067; H02J 7/0029; H02J 7/04; H01F 38/14
USPC .................................................. 320/101–108
See application file for complete search history.

(56) References Cited

U.S. PATENT DOCUMENTS 6,437,685 B2    8/2002    Hanaki
8,332,547 B2    12/2012    Sugaya
(Continued)

FOREIGN PATENT DOCUMENTS

CN    1956288    5/2007
JP    2005-151609    6/2005
(Continued)

OTHER PUBLICATIONS

PCT/ISA/237 Written Opinion issued on PCT/KR2011/001777 (pp. 3).
PCT/ISA/210 Search Report issued on PCT/KR2011/001777 (pp. 4).
Japanese Office Action dated Nov. 4, 2014 issued in counterpart application No. 2012-558076.
Japanese Decision dated Nov. 4, 2014 issued in counterpart application No. 2012-558076.

*Primary Examiner* — Binh Tat
(74) *Attorney, Agent, or Firm* — The Farrell Law Firm, P.C.

(57) ABSTRACT

A mobile terminal and a method for wirelessly charging the mobile terminal are provided. The method includes searching for a wirelessly rechargeable mobile terminal; receiving, upon finding a wirelessly rechargeable mobile terminal, power state information from the found rechargeable mobile terminal; setting the mobile terminal as one of a power supplying terminal and a power receiving terminal based on the received power state information; and performing a power charging operation with the found rechargeable mobile terminals according to the setting.

12 Claims, 2 Drawing Sheets

(56) References Cited

U.S. PATENT DOCUMENTS

| | | | |
|---|---|---|---|
| 8,421,592 B1* | 4/2013 | Gunasekara | H04W 12/06 320/104 |
| 2002/0043955 A1* | 4/2002 | Hansford | 320/106 |
| 2004/0142733 A1 | 7/2004 | Parise | |
| 2005/0194926 A1 | 9/2005 | Di Stefano | |
| 2007/0103110 A1 | 5/2007 | Sagoo | |
| 2008/0122401 A1 | 5/2008 | Sato et al. | |
| 2009/0096413 A1* | 4/2009 | Partovi | H01F 5/003 320/108 |
| 2009/0251008 A1 | 10/2009 | Sugaya | |
| 2009/0251309 A1 | 10/2009 | Yamasuge | |
| 2011/0050164 A1* | 3/2011 | Partovi et al. | 320/108 |
| 2011/0279244 A1* | 11/2011 | Park et al. | 340/10.34 |
| 2012/0098500 A1* | 4/2012 | Vestama et al. | 320/149 |
| 2014/0077696 A1 | 3/2014 | Kuennen at al. | |

FOREIGN PATENT DOCUMENTS

| | | |
|---|---|---|
| JP | 2005-210843 | 8/2005 |
| JP | 2005-287278 | 10/2005 |
| JP | 2006-087214 | 3/2006 |
| JP | 2006-517778 | 7/2006 |
| JP | 2006-287555 | 10/2006 |
| JP | 2007-124890 | 5/2007 |
| JP | 2007-158590 | 6/2007 |
| JP | 2008-148520 | 6/2008 |
| JP | 2008-206327 | 9/2008 |
| JP | 2008-268311 | 11/2008 |
| JP | 2009-251895 | 10/2009 |
| JP | 2009-253763 | 10/2009 |
| JP | 2010-028916 | 2/2010 |
| KR | 1020080106186 | 12/2008 |
| KR | 1020090056546 | 6/2009 |

* cited by examiner

METHOD AND APPARATUS FOR WIRELESSLY CHARGING A MOBILE TERMINAL

PRIORITY

This application is a National Phase Entry of PCT International Application No. PCT/KR2011/001777, which was filed on Mar. 14, 2011, and claims priority to Korean Patent Application Serial No. 10-2010-0022534, which was filed in the Korean Intellectual Property Office on Mar. 12, 2010, the contents of each of which are incorporated herein by reference.

BACKGROUND OF THE INVENTION

1. Field of the Invention

The present invention relates generally to charging a mobile terminal, and more particularly, to a mobile terminal and a method for receiving wireless charging from another mobile terminal or providing wireless charging to another mobile terminal.

2. Description of the Related Art

Mobile terminals such as mobile phones, Personal Digital Assistants (PDAs), etc., are powered by rechargeable batteries that are charged with electrical energy supplied by a separate charging apparatus. In general, a separate contact terminal is arranged outside of the charging apparatus and the battery, and the charging apparatus and the battery are electrically connected to each other through contact between them.

However, since the contact terminal protrudes outwardly in such a contact-type charging scheme, the contact terminal is easily contaminated by foreign substances, and in such cases, battery charging may not be performed correctly. Further, battery charging may not be performed correctly when the contact terminal is exposed to moisture.

Recently, a wireless charging (i.e., a non-contact charging technology) has been developed and used for electronic devices to address the above-mentioned problems.

Such a wireless charging technology employs wireless power transmission/reception, and corresponds to, for example, a system in which a battery can be automatically charged if the battery is laid on a charging pad, without the need to connect the mobile phone to a separate charging connector. The wireless charging technology is generally used for devices such as a wireless electric toothbrush or a wireless electric shaver. Accordingly, a waterproof function of such devices can be improved, and the portability of such electronic devices can be increased, since there is no need to provide a wired charging apparatus. Technologies related to wireless charging technology are also expected to be significantly developed in the coming age of electric cars.

Wireless charging technology commonly includes an electromagnetic induction scheme using a coil, a resonance scheme using a resonance, and a Radio Frequency (RF)/microwave radiation scheme converting electrical energy to a microwave and then transmitting the microwave.

The electromagnetic induction scheme is commonly-used, but it is expected eventually, all electronic products will be charged, at any time and location, without a wire, due to the strength of recent successful experiments for wirelessly transmitting power to a destination dozens of meters away, through the use of microwaves.

A power transmission method through the electromagnetic induction corresponds includes transmitting power between a first coil and a second coil. When a magnet approaches the coil, an induced current is generated. A transmission side generates a magnetic field by using the induced current and a reception side generates energy through an induced current according to changes in the magnetic field. The phenomenon is referred to as magnetic induction, and power transmission methods using magnetic induction transmit energy very efficiently.

Power transmission methods through electromagnetic induction have been commercialized, and are applied to various devices. The electromagnetic induction scheme makes up a majority of the non-contact charging technology corresponding to wireless charging, and this technology was originally applied to products such as electric shavers, electric toothbrushes, etc., using a nickel battery.

Another wireless charging scheme uses resonance. Prof. Soljacic of the Massachusetts Institute of Technology (MIT) announced a system in which electricity is wirelessly transferred using a resonance-based power transmission principle, based on a coupled mode theory that operates even when a device to be charged is separated from a charging device by several meters. This wireless charging system used by an MIT team employs a resonance concept in physics in which, when a tuning fork oscillates at a particular frequency, a wine glass next to the tuning fork will tend to oscillate at the same frequency. The research team resonated an electromagnetic wave containing electrical energy instead of resonating sounds. The resonated electrical energy is directly transferred only when there is a device having a resonance frequency, and parts of electrical energy that are not used are reabsorbed into an electromagnetic field instead of being spread in the air, so that the electrical energy does not affect surrounding machines or people, in contrast to other electromagnetic waves.

Lastly, there is the RF/microwave radiation scheme. The RF/microwave radiation scheme is a new conceptual power transmission method of converting energy to a microwave favorable to wireless transmission and then transmitting the converted energy. The microwave scheme transmits the power energy instead of a concept of a signal used in the wireless communication technology such as a radio, a wireless phone or the like. While normal communication corresponds to carrying a signal on a carrier signal and then transmitting the carrier signal, the wireless power transmission corresponds to transmitting only the carrier.

A wireless charging system to which the wireless charging technology is applied typically includes a charging stand for supplying power to a terminal. Accordingly, there is a disadvantage in that, in such a system, wireless charging is only possible in locations of charging stands.

SUMMARY OF THE INVENTION

Accordingly, the present invention is provided to address the above-described problems and provide at least the advantages described below.

According to an aspect of the present invention, there a method for wirelessly charging a mobile terminal is provided. The method includes searching for a wirelessly rechargeable mobile terminal; receiving, upon finding a wirelessly rechargeable mobile terminal, power state information from the found rechargeable mobile terminal; setting the mobile terminal as one of a power supplying terminal and a power receiving terminal based on the received power state information; and performing a power charging operation with the found rechargeable mobile terminals according to the setting.

According to another aspect of the present invention, a mobile terminal is provided. The mobile terminal includes a wireless communication unit; a wireless charging module for wirelessly transmitting and receiving power; and a controller for searching a wirelessly rechargeable mobile terminal through the wireless communication module, receiving, upon finding a wirelessly rechargeable mobile terminal, power state information from the found rechargeable mobile terminal, setting the mobile terminal as one of a power supplying terminal and a power receiving terminal based on the received power state information, and performing a power charging operation according to the setting.

BRIEF DESCRIPTION OF THE DRAWINGS

The above and other aspects, features, and advantages of embodiments of the present invention will be more apparent from the following description taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. Further, in the following description, detailed descriptions of known functions and configurations incorporated herein may be omitted when such a description may obscure the subject matter of the present invention.

According to embodiments of the present invention, it is possible to efficiently charge a mobile terminal requiring charging by enabling terminals that are located in surrounding areas of the mobile terminal and are capable of wirelessly supplying power, to wirelessly supply power to the mobile terminal according to a request of the mobile terminal after a series of processes.

Herein, a power-supplying terminal for providing power serves as a master in wireless charging, and a power-receiving terminal for receiving power serves as a slave in wireless charging.

According to embodiments of the present invention, the mobile terminal searches for another neighbor mobile terminal capable of wirelessly supplying power, determines whether the mobile terminal supplies or receives power according to a power state of the mobile terminal and a power state of the found another mobile terminal, and supplies or receives power to or from the corresponding mobile terminal according to the determination.

Figure 1:
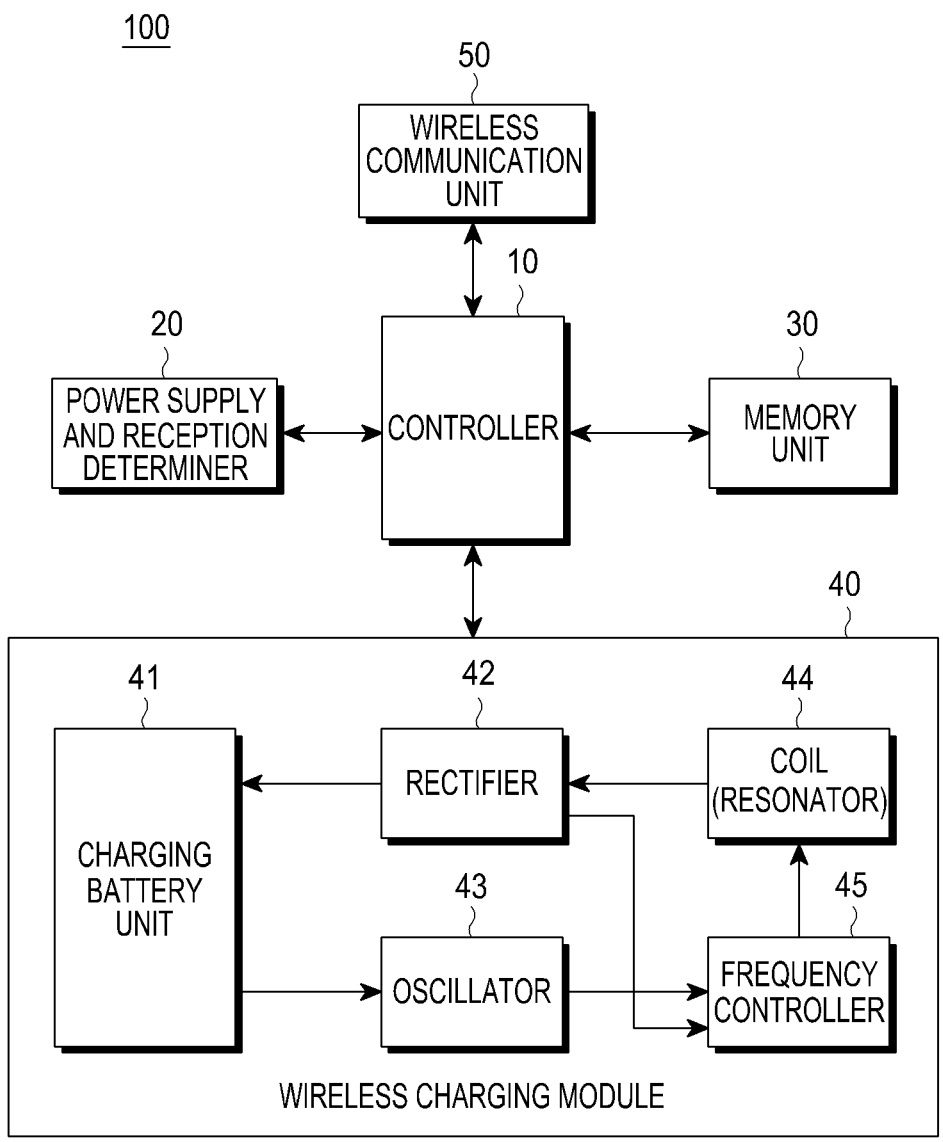
FIG. 1 is a configuration diagram of a mobile terminal for wireless charging according to an embodiment of the present invention.

An example of the configuration of the mobile terminal to which the present invention is applied is illustrated in FIG. 1. Although embodiments of the present invention described herein refer to mobile terminals as an example, electronic devices such as mobile phones, PDAs, notebooks, personal computers, portable terminals, and other various consumer electronics may be used in accordance with embodiments of the present invention.

FIG. 1 is a configuration diagram of a mobile terminal for wireless charging according to an embodiment of the present invention.

Referring to FIG. 1, a mobile terminal 100 can supply or receive wireless charging to or from another mobile terminal. The mobile terminal 100 includes a controller 10, a power supply and reception determiner 20, a memory unit 30, a wireless charging module 40, and a wireless communication unit 50.

The controller 10 controls general operations of the mobile terminal 100, and controls operations of each component included in the mobile terminal according to embodiments of the present invention. When mobile terminals are located within a distance in which the mobile terminals can be recharged, the controller 10 exchanges identification information such as an IDentification (ID) for identifying information between the mobile terminals and identifies whether the mobile terminals are mobile terminals that can wirelessly supply power and/or be recharged.

At this time, the controller 10 mutually exchanges the identifying information through the wireless communication unit 50 and performs a search process of identifying whether the mobile terminal is capable of wirelessly supplying or receiving power. An authentication process of identifying whether a predetermined mobile terminal is suitable for wireless charging may be defined by a manufacturer, and/or an additional authentication may be performed, even upon a determination that the mobile terminal can wirelessly supply and receive power. The controller 10 exchanges power state information with the mobile terminal found through the wireless communication unit 50 to determine which terminal will operate as a power supplying terminal for wirelessly supplying power and which terminal will operate as a power receiving terminal for wirelessly receiving power in the wireless charging from the mobile terminal 100 and the found mobile terminal.

Such power state information contains information such as a residual power amount, an amount of power available to be provided, a charging requirement reference value, and a surplus power reference value.

The power state information received from the found mobile terminal is transferred to the power supply and reception determiner 20, and the power supply and reception determiner 20 determines which terminals will operate as the power supplying terminal and the power receiving terminal based on the power state information. According to various embodiments of the present invention, the power supplying terminal and the power receiving terminal can be determined by a mobile terminal having searched for a neighbor mobile terminal, or determined by a mobile terminal found by another mobile terminal.

Further, the power supply and reception determiner 20 compares a providable power amount of the mobile terminal (i.e., an amount of power available for providing to another terminal) and a providable power amount of the found mobile terminal to determine a mobile terminal having a larger providable power amount as the power supplying terminal and determine a mobile terminal having a lesser providable power amount as the power receiving terminal.

Moreover, the power supply and reception determiner 20 determines a mobile terminal having a higher power occupancy rate as the power supplying terminal and determines a mobile terminal having a lower power occupancy rate as the power receiving terminal by considering power state information such as the residual power amount, the providable power amount, the charging requirement reference value, and the surplus power reference value of each mobile terminal.

Herein, the power occupancy rate refers to correlation between a power amount required by a corresponding mobile terminal to stably operate and a residual power amount or a providable power amount.

According to another embodiment of the present invention, a mobile terminal urgently requiring the power reception can receive power regardless of power amounts possessed by mobile terminals by indicating its urgent state in an initial ID exchange.

The power supply and reception determiner 20 determines whether corresponding mobile terminals are the power supply terminals for supplying power or the power receiving terminals for receiving power to perform wireless charging between the mobile terminals.

The controller 10 determines whether to operate the wireless charging module 40 in a power supply mode or a power reception mode based on the information on the determination. In order to determine the mobile terminals for supplying/receiving power, the power supply and reception determiner 20 performs the determination based on a power amount set in each mobile terminal. More specifically, the power supply and reception determiner 20 sets a mobile terminal having relatively large power amount as the power supplying terminal, and sets a mobile terminal having a relatively small power amount as the power receiving terminal.

Further, when one mobile terminal receives notification information for notifying the mobile terminal that a counterpart mobile terminal is a mobile terminal urgently requiring the power supply from the counterpart mobile terminal, the power supply and reception determiner 20 may set the counterpart mobile terminal as the power reception terminal regardless of the power amount.

The power supply and reception determiner 20 may be included in the controller 10 according to embodiments of the present invention. Alternatively, the search process and the authentication process of the controller 10 may be performed by the power supply and reception determiner 20.

The memory unit 30 stores programs for processing and control by the controller 10, reference data, renewable various storage data, data received from the outside, data generated according to a user's input and the like, and is provided as a working memory of the controller 12. Further, the memory unit 13 stores power information of the mobile terminal 100. According to an embodiment of the present invention, the power information contains the charging requirement reference value, the surplus power reference value, and the residual power amount. The residual power amount refers to the remaining power amount of the mobile terminal 100, which is checked in real time or periodically. The charging requirement reference value is a power value that is a reference for determining whether the charging is required, and the surplus power reference value is a power value that is a reference for determining whether the mobile terminal can supply power to another mobile terminal. The charging requirement reference value and the surplus power reference value may be different for each mobile terminal.

The wireless communication unit 50 is transmits and receives various information and messages required in a wireless charging process through near field communication under a control of the controller 10, and may include, for example, a Bluetooth module, a Radio Frequency ID (RFID) communication apparatus, etc. According to an embodiment of the present invention, the wireless communication unit 50 may be an RFID communication apparatus, and accordingly the wireless communication unit 50 may include an RFID reader and an RFID tag.

The wireless charging module 40 wirelessly supplies/receives power, and may be configured by, for example, one of an electromagnetic induction scheme, a resonance scheme, and an RF/microwave radiation scheme or configured according to another wireless power providing scheme.

It is assumed that the wireless charging module 40 is configured according to the resonance scheme in an embodiment of the present invention. Accordingly, the wireless charging module 40 includes a charging battery unit 41, a rectifier 42, an oscillator 43, a coil (resonator) 44, and a frequency controller 45.

The charging battery unit 41 stores wirelessly supplied power, and the power stored in the charging battery unit 41 may be provided to another mobile terminal through the oscillator 43. The power stored in the charging battery unit 41 is converted to oscillate at a preset oscillation frequency by the oscillator 43, and the converted power is wirelessly provided to another mobile terminal through an antenna having the same resonance frequency as the oscillation frequency, that is, the coil (resonator) 44. The oscillation frequency may be, for example, an RFID frequency of 13.56 MHz. Since an optimal resonance frequency may vary depending on external conditions, the frequency converter 45 converts the resonance frequency of the coil (resonator) 44 in order to increase the efficiency according to a control of the controller 10. Further, the coil (resonator) 44 can receive power wirelessly provided from another mobile terminal, and the received power is stored in the charging battery unit 41 through the rectifier 42.

Figure 2:
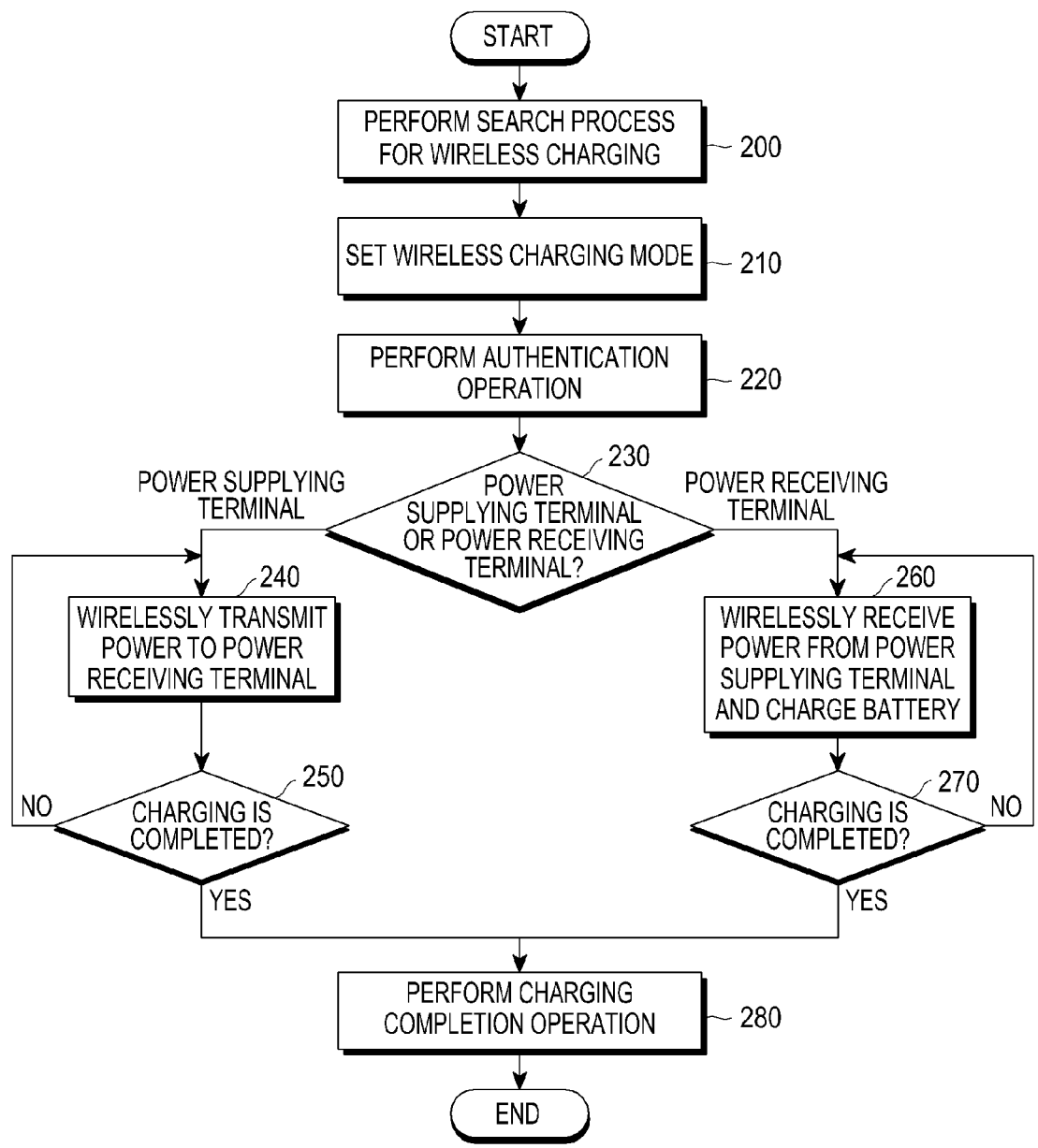
FIG. 2 is a flowchart illustrating a wireless charging operation of a mobile terminal for wireless charging according to an embodiment of the present invention.

FIG. 2 is a flowchart illustrating a wireless charging operation of the mobile terminal for wireless charging according to an embodiment of the present invention.

Referring to FIG. 2, the controller 10 performs a wireless charging search operation, in step 200. Specifically, the controller 10 in a first terminal broadcasts a search request message to a second terminal located in a surrounding area through the wireless communication unit 50. At this time, the search request message contains an identification (ID) of the first terminal. The identification ID refers to an identifier of a mobile terminal indicating that the mobile terminal is a mobile terminal that can wirelessly provide/receive power. The search request message can be transmitted upon a determination that power reception is required or power supply to another mobile terminal is required.

Upon receiving a search request response message containing its own identification ID from the second terminal, the controller 10 sets a wireless charging mode in step 210. More specifically, the controller 10 transmits a mode switching request message to the second terminal. The mode switching request message may contain setting parameters to be set to the wireless charging model 40 between the two devices in order to wirelessly transmit and receive power. According to an embodiment of the present invention, the setting parameters may include a charging band, a frequency, etc., as the wireless charging module 40 is implemented in the resonance scheme. The setting parameters are set to the wireless charging module 40 when actual wireless charging have yet to be determined. Although, in the present example, the setting parameters of the first terminal required for wirelessly transmitting power are included in the mode switching request message and then transmitted to the second terminal, according to another embodiment of the present invention, setting parameters of the second terminal may be included in a mode switching response message and then transmitted to the first terminal.

When a mode switching request response message is received from the second terminal, the controller 10 performs an authentication operation between the first terminal and the second terminal in step 220. More specifically, upon receiving the mode switching request response message, the controller 10 transmits an authentication request message containing authentication information to the second terminal. When the authentication is completed through an authentication process using the authentication information contained in the authentication request message, the second terminal transmits an authentication request response message to the first terminal and terminates an authentication procedure.

In addition to the above-described authentication, an additional authentication process may be required according to a security level of the mobile terminals. For example, the first terminal may be configured to perform the authentication process by including the authentication information of the second terminal in the authentication request response message.

After the completion of the authentication procedure, the controller 10 determines which of the first terminal and the second terminal are a power supplying terminal and a power receiving terminal, in step 230. When the first terminal is the power supplying terminal and the second terminal is the power receiving terminal, step 240 is performed. When the first terminal is the power receiving terminal and the second terminal is the power supplying terminal, step 250 is performed.

For example, when the controller 10 receives a state information message containing power state information associated with a power state of the second terminal from the second terminal, the controller 10 determines the power supplying terminal and the power receiving terminal from the first terminal and the second terminal based on a residual power amount, and a surplus power reference value, and a charging requirement reference value of the first terminal, and information contained in the received state information message. The power state information contains the residual power amount, the charging requirement reference value, and the surplus power reference value of the first terminal, and may further contain a required power amount, a providable power amount, etc.

Accordingly, the controller 10 compares a providable power amount of each terminal to determine a terminal having a larger providable power amount as a power supplying apparatus and determine a terminal having the least amount of providable power as a power receiving apparatus. Further, the controller 10 calculates and determines the providable power amount of the terminal determined as the power supplying apparatus, and then transmits a power information identification message containing contents of the determination.

According to an alternative embodiment of the present invention, the determination of the power supplying apparatus and the power receiving apparatus, and the determination of the providable power amount may performed by the second terminal. In this case, the second terminal transmits a power state information message to the first terminal and requests the power state information from the first terminal, and the first terminal inserts its own power state information in a state information response message and transmits the state information response message, so that the second terminal is able to determines the power supplying apparatus, the power receiving apparatus, the providable power amount, etc., based on the collected information. Then, the second terminal notifies the first terminal of the determination results.

When the residual power amount of the first terminal is greater than the surplus power reference value of the second terminal, the controller 10 sets the first terminal as the power supplying terminal.

In step 240, the controller 10 transmits its own power to the second terminal, which is the power receiving terminal. More specifically, each of the two terminals sets its own wireless charging module 40 by using the transmitted setting parameter, and one of the two mobile terminals transmits a charging start message. Further, in a process of wirelessly transmitting and receiving power, one terminal transmits a charging information message for guiding a power provision progress matter, and a mobile terminal having received the charging information message transmits a charging information identification message in response to the charging information message. The charging information message and the charging information identification message may be used for purposes of informing the user of total charging information, and helps a determination on whether power transmission is stopped when the power transmission is unexpectedly stopped.

Accordingly, when the charging start message is received from the second terminal, the controller 10 wirelessly provides power to the second terminal. When the charging information message containing charging information such as the power amount, etc., are provided from the second terminal, the controller 20 transmits a response message to the second terminal and repeats transmission and reception of such messages until the charging is completed.

The controller 10 determines whether the charging is completed in step 250, and proceeds to step 280 upon a determination the charging is completed. Otherwise, the controller 10 proceeds to step 240 and continuously transmits power to the second terminal, which is the power receiving terminal.

In step 260, the controller 10 receives power from the second terminal corresponding to the power supplying terminal to charge a battery. More specifically, the controller 10 transmits the charging start message to the second terminal and receives power from the coil (resonator) 44, and Alternating Current (AC) power is converted to Direct Current (DC) power through the rectifier 42 and then charged in the charging battery 41.

The controller 10 determines whether the charging is completed in step 270, and proceeds to step 280 upon a determination that the charging is completed. Otherwise, the controller 10 proceeds to step 260, and wirelessly receives power continuously from the second terminal, which is the power supplying terminal to charge the battery.

When the charging is completed, the controller 10 performs a charging completion operation in step 280. More specifically, when the first terminal is the power supplying terminal, the controller 10 transmits a power transmission completion message to the second terminal after transmitting an initially determined power supply amount. When the first terminal is the power receiving terminal, if the power transmission completion message is received from the second terminal, the controller 10 transmits a power transmission completion identification message containing a final power reception report to the second terminal. For example, the rectifier 42 further includes a circuit structure such as a load modulation circuit (not shown) and changes an impedance in a charging power state according to a predetermined rule when the charging is completed, and thus a signal for the changed impedance may be transmitted to the power supplying apparatus.

As described above, embodiments of the present invention allow mobile terminals that can wirelessly supply or receive power to be easily charged as necessary by determining which terminal is the power supplying apparatus and the power receiving apparatus based on their residual power amounts and accordingly performing power charging.

Embodiments of the present invention also provide a message exchange process for various scenarios between two mobile terminals with respect to the wireless charging.

According to embodiments of the present invention, it is possible to perform wireless charging between mobile terminals without a separate charging stand, and it is further possible to wirelessly supply or receive power according to power states of the mobile terminals.

Configurations and operations of apparatuses and methods for wirelessly charging the mobile terminal according to embodiments of the present invention may be implemented as described above. While embodiments of the present invention have been described hereinabove, various modifications may be made thereto without departing the scope of the present invention as defined by the appended claims.

The invention claimed is:

1. A method for wirelessly charging a mobile terminal, the method comprising:
  detecting one or more wirelessly rechargeable mobile terminals;
  receiving, after finding one or more wirelessly rechargeable mobile terminals, power state information from the found one or more rechargeable mobile terminals, respectively;
  setting the mobile terminal as one of a power supplying terminal and a power receiving terminal, and setting one of the found one or more rechargeable mobile terminals as the other of the power supplying terminal and the power receiving terminal, by comparing power state information of the mobile terminal with the received power state information of the found one or more mobile terminals, wherein the power state information contains at least one of residual power amount information indicating a currently remaining power amount in each of the found one or more rechargeable mobile terminals, a charging requirement reference value indicating a charging need of each of the found one or more rechargeable mobile terminals, and a surplus power reference value indicating an ability for each of the found one or more rechargeable mobile terminals to supply power to other mobile terminals; and
  performing a power charging operation with the one of the found one or more rechargeable mobile terminals according to the setting.

2. The method as claimed in claim 1, wherein performing the power charging operation comprises supplying power to the one of the found one or more rechargeable mobile terminals which is set as the power receiving terminal, when the mobile terminal is set as the power supplying terminal.

3. The method as claimed in claim 1, wherein the power charging operation comprises receiving power from the one of the found one or more rechargeable mobile terminals which is set as the power supplying terminal, when the mobile terminal is set as the power receiving terminal.

4. The method as claimed in claim 1, wherein setting the mobile terminal as one of the power supplying terminal and the power receiving terminal by comparing power state information of the mobile terminal with the received power state information of the found one or more mobile terminals comprises:
  setting the mobile terminal as the power supplying terminal when a providable amount of power of the mobile terminal calculated based on power state information of the mobile terminal is greater than a providable amount of power of one selected from among the found one or more rechargeable mobile terminals indicated by the received power state information of the selected rechargeable mobile terminal; and
  setting the mobile terminal as the power receiving terminal when the calculated providable amount of power of the mobile terminal is less than the received providable amount of power of the selected rechargeable mobile terminal indicated by the received power state information of the selected rechargeable mobile terminal.

5. The method as claimed in claim 1, wherein setting the mobile terminal as one of the power supplying terminal and the power receiving terminal by comparing power state information of the mobile terminal with the received power state information of the found one or more mobile terminals further comprises setting, from among the mobile terminal and the found one or more rechargeable mobile terminals, a mobile terminal requesting urgent power reception as the power receiving terminal.

6. The method as claimed in claim 4, wherein setting one of the found one or more rechargeable mobile terminals as the other of the power supplying terminal and the power receiving terminal by comparing power state information of the mobile terminal with the received power state information of the found one or more mobile terminals comprises:
  setting the selected rechargeable mobile terminal as power receiving terminal if the mobile terminal is set as the power supplying terminal; and
  setting the selected rechargeable mobile terminal as power supplying terminal if the mobile terminal is set as the power receiving terminal.

7. A mobile terminal comprising:
  a wireless communication unit;
  a wireless charging module for wirelessly transmitting and receiving power; and
  a controller for detecting one or more wirelessly rechargeable mobile terminals through the wireless communication module, receiving, after finding one or more wirelessly rechargeable mobile terminals, power state information from the found one or more rechargeable mobile terminals, setting the mobile terminal as one of a power supplying terminal and a power receiving terminal, by comparing power state information of the mobile terminal with the received power state information of the found one or more mobile terminals, and setting one of the found one or more rechargeable mobile terminals as the other of the power supplying terminal and the power receiving terminal, by comparing power state information of the mobile terminal with the received power state information of the found one or more mobile terminals, and performing a power charging operation with the one of the found one or more rechargeable mobile terminals according to the setting, wherein the power state information contains at least one of residual power amount information indicating a currently remaining power amount in each of the found one or more rechargeable mobile terminals, a charging requirement reference value indicating a charging need of each of the found one or more rechargeable mobile terminals, and a surplus power reference value indicating an ability for each of the found one or more rechargeable mobile terminals to supply power to other mobile terminals.

8. The mobile terminal as claimed in claim 7, wherein the controller supplies power to the one of the found one or more rechargeable mobile terminals which is set as the power receiving terminal, when the mobile terminal is set as the power supplying terminal.

9. The mobile terminal as claimed in claim 7, wherein the controller receives power from the one of the found one or more rechargeable mobile terminals which is set as the power supplying terminal when the mobile terminal is set as the power receiving terminal.

10. The mobile terminal as claimed in claim 7, wherein the controller sets the mobile terminal as the power supplying terminal when a providable amount of power of the mobile terminal calculated based on power state information of the mobile terminal is greater than a providable amount of power of one selected from among the found one or more rechargeable mobile terminals indicated by the received power state information of the selected rechargeable mobile terminal, and sets the mobile terminal as the power receiving terminal when the calculated providable amount of power of the mobile terminal is less than the received providable amount of power of the selected rechargeable mobile terminal indicated by the received power state information of the selected rechargeable mobile terminal.

11. The mobile terminal as claimed in claim 7, wherein the controller sets, from among the mobile terminal and the found one or more rechargeable mobile terminals, a mobile terminal requesting urgent power reception as the power receiving terminal.

12. The mobile terminal as claimed in 10, the controller sets the selected rechargeable mobile terminal as power receiving terminal if the mobile terminal is set as the power supplying terminal, and sets the selected rechargeable terminal as power supplying terminal if the mobile terminal is set as the power receiving terminal.

\* \* \* \* \*